Oct. 14, 1930.　　　　B. F. FRANCE　　　　1,778,590
GLASS DRAWING MACHINE
Filed Feb. 18, 1927　　　3 Sheets-Sheet 2
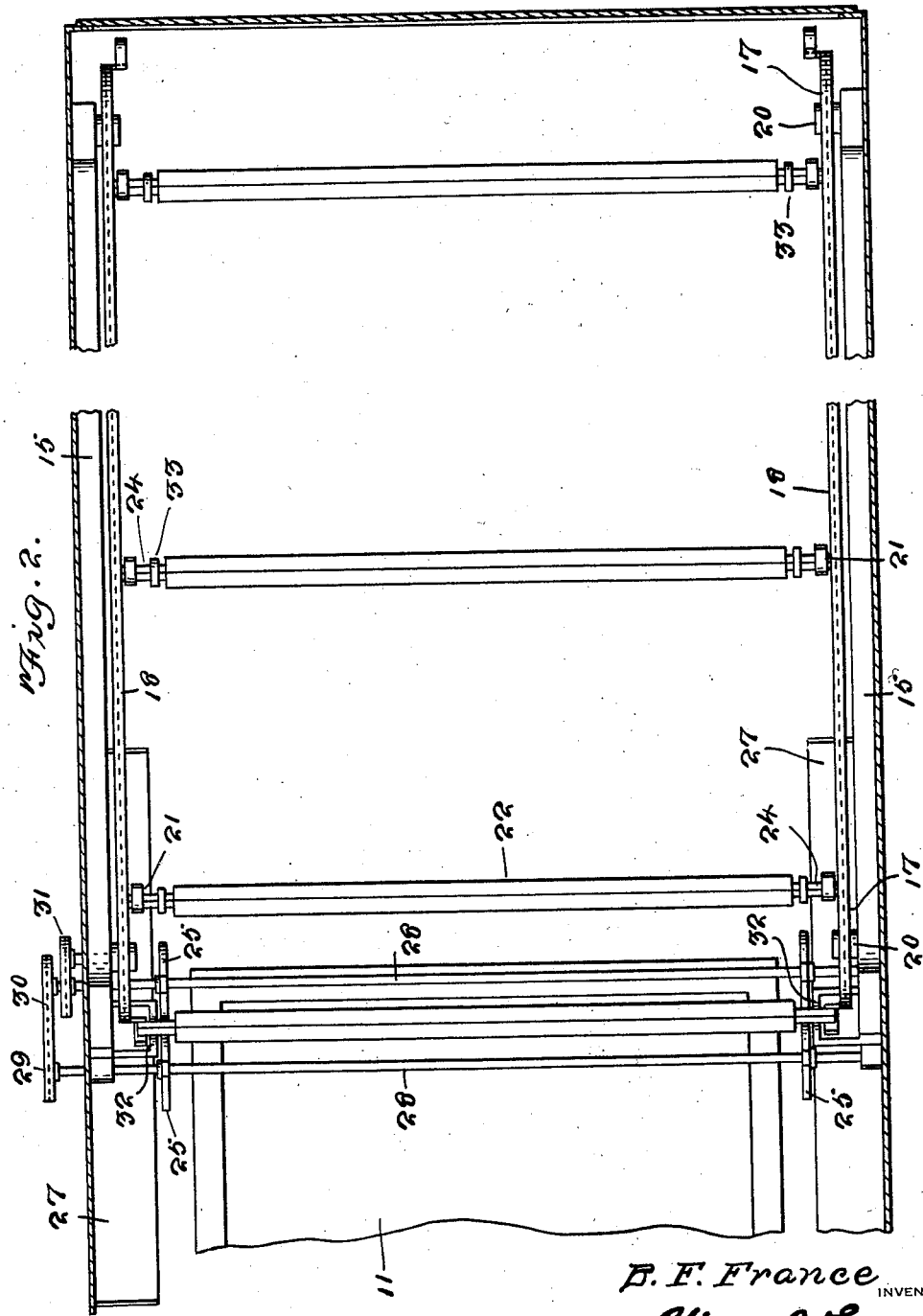

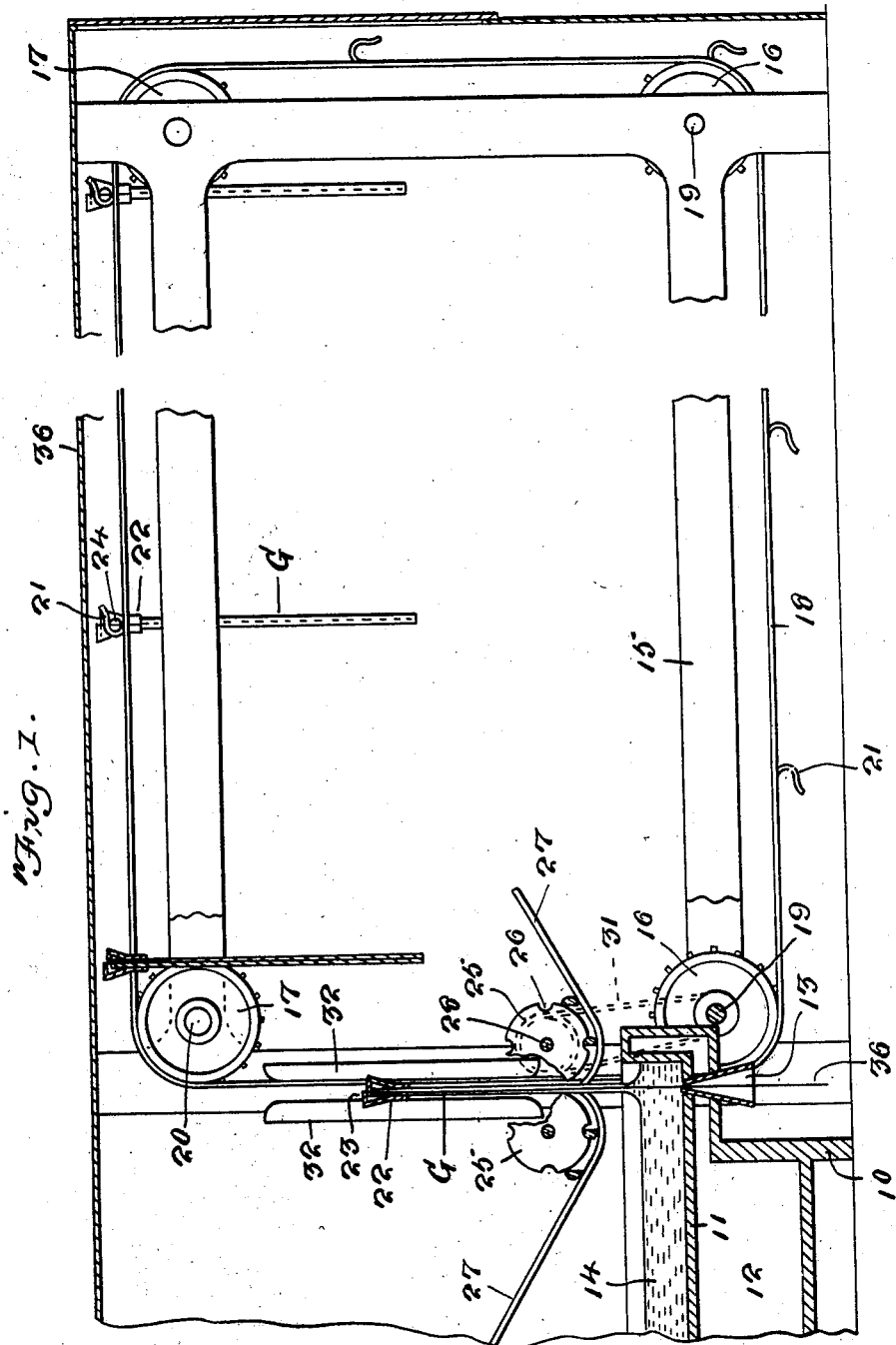

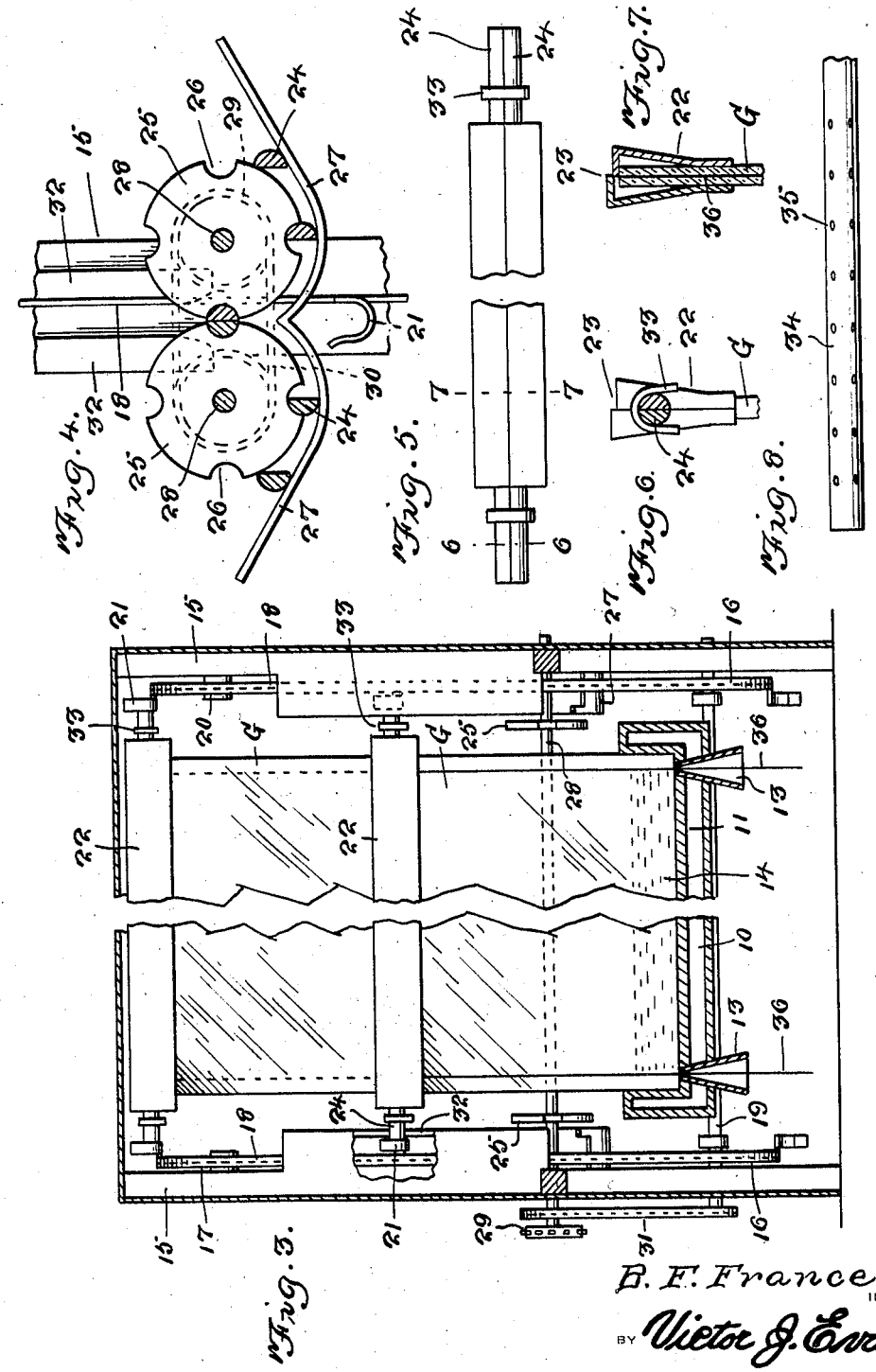

Patented Oct. 14, 1930

1,778,590

UNITED STATES PATENT OFFICE

BENJAMIN F. FRANCE, OF PORTSMOUTH, OHIO

GLASS-DRAWING MACHINE

Application filed February 18, 1927. Serial No. 169,304.

This invention relates to glass making machines of the type wherein a continuous sheet of glass is drawn from a crucible and cut to the desired lengths and annealed, one of the objects of the invention being to provide means for utilizing the waste heat from the melting furnace for annealing the glass.

Another object of the invention is the provision of novel means for cutting the glass into sheets and gripping said sheets while the latter are annealed, so that the sheets will not be handled until properly cooled and thereby preserve their finish.

Another object of the invention is the provision of novel means for initially drawing the glass from the crucible.

With the above and other objects in view, the invention further includes the following novel features and details of construction, to be hereinafter more fully described, illustrated in the accompanying drawings and pointed out in the appended claims.

In the drawings:—

Figure 1 is a vertical sectional view partly broken away and illustrating the invention.

Figure 2 is a horizontal section through the machine casing with the mechanism shown in top plan view.

Figure 3 is a transverse vertical sectional view partly broken away.

Figure 4 is an enlarged fragmentary vertical section illustrating the manner of feeding the combined cutters and clamps to the glass.

Figure 5 is a top plan view of one of the combined cutters and clamps.

Figure 6 is a section on the line 6—6 of Figure 5.

Figure 7 is a similar view on the line 7—7 of Figure 5.

Figure 8 is a fragmentary view of the gathering bar.

Referring to the drawings in detail wherein like characters of reference denote corresponding parts, there is illustrated at 10 a fragmentary portion of a glass furnace which includes a crucible 11 and a fire pot 12 of any preferred construction. The bottom of the crucible is provided adjacent each side with an opening from which extends a hollow conical guide 13. The molten glass within the crucible is indicated at 14.

Arranged adjacent the crucible is a pair of endless carriers which are supported by frames 15. These carriers include lower sprocket wheels 16 and upper sprocket wheels 17, over which passes endless steel chains or belts 18, one of which is provided adjacent each of the frames 15. The sprocket wheels 16 are mounted upon shafts 19 which extend from one frame to the other, while the sprockets 17 are mounted upon stub shafts 20, as clearly shown in Figure 3 of the drawings. The belts or chains 18 carry suitable engaging devices which are shown in the form of hooks 21.

The hooks 21 are adapted to engage combined cutters and gripping devices illustrated in detail in Figures 5, 6 and 7 of the drawings. These devices comprise elongated members or plates 22 which carry cutting blades 23, the plates 22 forming a clamping or gripping means which engages the sheet glass G, as clearly shown in Figure 7 of the drawings. The plates 22 have extending from their opposite ends substantially semi-circular members 24 and when arranged in operative relation, these extensions 24 form trunnions to be engaged with the hooks 21.

The members which form the combined cutters and clamps are brought into operative position by means of feeding wheels 25 which are provided with spaced notches 26. These notches are adapted to receive one member of each of the clamps so as to feed the latter to the glass sheet, the members of the clamp being movable along guides 27. The feeding disks 25 are mounted upon shafts 28 which carry sprocket wheels 29 and these wheels are operatively connected by means of a chain 30. One of the shafts 19 may be utilized as a drive shaft and one of the shafts 28 may be driven from a shaft 19 by means of a sprocket drive 31. Positioned to receive the trunnions of the gripping members as the latter leave the wheels 25 are spaced guides 32, and when the trunnions enter these guides, the gripping members will have engaged opposite sides of the glass sheet. Retaining devices in the form of substantially U-shaped members 33 are then engaged over the trunnions so as to prevent their separation. The gripping members are moved upward through the guides by engagement of the trunnions with the hooks 21.

In order to initially start the glass from the crucible there is provided a gripping bar 34. This bar is of hollow tubular construction and is provided with spaced openings 35. The bar is dipped in the molten glass and engaged with a pair of hooks 21 so that it will move upward. Wires 36 are fed upward through the conical guides 13, so that one of these wires will be positioned in each edge of the sheet and prevent recession of the edges and wrinkling of the sheet. After the glass has been initially started by the use of the gathering bar, the combined clamping and cutting devices are fed to the sheet, so that the sheets are cut into the desired length and moved vertically and horizontally by the cutters. The length of the sheets may be regulated by the spacing notches 26.

It is preferred to enclose the entire mechanism including the furnace in a housing 36, so that the waste heat of the furnace will be distributed throughout the housing and the glass will be gradually cooled and annealed before it leaves the carriers. This provides for an economy in operation and cools the glass properly without requiring the sheet to be handled. The proper finish of the sheet is thus preserved.

Through the use of the perforated gathering bar, the glass will gather upon the inside of the said bar and form an anchor so as to provide a positive connection between the bar and glass. The drive shaft may be operated from a suitable source of power by means of suitable gearing, the speed of which may be changed to provide for different thicknesses of glass.

The invention is susceptible of various changes in its form, proportions and minor details of construction and the right is herein reserved to make such changes as properly fall within the scope of the appended claims.

Having described the invention what is claimed is:—

1. In a glass drawing machine, a crucible, endless carriers positioned adjacent the crucible, means engageable with the carriers to initially draw the glass from the crucible, and a combined shear and clamp also engageable with the carriers to cut and grip the glass, said shear and clamp comprising a pair of elongated complemental members including horizontally arranged cutting blades, transversely semi-cylindrical extensions at each end thereof, means to bring the members into operative relation with the glass at predetermined intervals and means to lock said members to prevent accidental separation.

2. In a glass drawing machine, a crucible, endless carriers positioned adjacent the crucible, means engageable with the carriers to initially draw the glass from the crucible, and a combined shear and clamp also engageable with the carriers to cut and grip the glass, said shear and clamp comprising a pair of elongated complemental members including horizontally arranged cutting blades, transversely semi-cylindrical extensions at each end thereof, means to feed the members to the glass, means to guide said members into operative relation and means removably positioned over the semi-cylindrical extensions to lock said members to prevent accidental separation.

In testimony whereof I affix my signature.

BENJAMIN F. FRANCE.